US007492065B2

(12) United States Patent
Wang et al.

(10) Patent No.: US 7,492,065 B2
(45) Date of Patent: Feb. 17, 2009

(54) CIRCUIT FOR INITIATING CONDUCTIVE LIQUID DROPLET MOTION IN A SWITCH

(75) Inventors: Youfa Wang, Singapore (SG); Thiam Siew Gary Tay, Singapore (SG); Soo Kiang Ho, Singapore (SG); Roy Wei Kiat Tan, Singapore (SG); Patrick Wai Kit Lau, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 444 days.

(21) Appl. No.: 11/318,995

(22) Filed: Dec. 27, 2005

(65) Prior Publication Data

US 2007/0144881 A1 Jun. 28, 2007

(51) Int. Cl.
*G05D 24/02* (2006.01)
*G05D 5/00* (2006.01)

(52) U.S. Cl. .................................................... 307/139

(58) Field of Classification Search ................. 307/139
See application file for complete search history.

(56) References Cited

U.S. PATENT DOCUMENTS

| | | | | |
|---|---|---|---|---|
| 6,323,447 | B1 * | 11/2001 | Kondoh et al. | 200/182 |
| 6,430,265 | B2 * | 8/2002 | Prins et al. | 378/158 |
| 6,438,211 | B1 * | 8/2002 | Weekamp et al. | 378/158 |
| 6,453,012 | B2 * | 9/2002 | Herbert | 378/158 |
| 6,473,492 | B2 * | 10/2002 | Prins et al. | 378/158 |
| 6,911,132 | B2 * | 6/2005 | Pamula et al. | 204/600 |
| 6,989,234 | B2 * | 1/2006 | Kolar et al. | 435/6 |
| 7,271,688 | B1 * | 9/2007 | Beerling et al. | 335/47 |
| 2006/0081643 | A1 * | 4/2006 | Haluzak et al. | 222/52 |

* cited by examiner

*Primary Examiner*—Michael J Sherry
*Assistant Examiner*—Adi Amrany

(57) ABSTRACT

A circuit for actuating a switch includes a conductive liquid switch comprising a conductive liquid droplet and a control processor configured to receive a switching signal and configured to provide at least one actuation pulse to the conductive liquid droplet to initiate movement of the conductive liquid droplet based on a duration of a time period between the switching signal and a preceding switching signal.

19 Claims, 4 Drawing Sheets

CIRCUIT FOR INITIATING CONDUCTIVE LIQUID DROPLET MOTION IN A SWITCH

BACKGROUND

Many switching technologies rely on solid, mechanical contacts that are alternatively actuated from one position to another to make and break electrical contact. Unfortunately, mechanical switches that rely on solid-to-solid contact are prone to wear and are subject to a condition known as "fretting." Fretting refers to erosion that occurs at the points of contact on surfaces. Fretting of the contacts is likely to occur under load and in the presence of repeated relative surface motion. Fretting typically manifests as pits or grooves on the contact surfaces and results in the formation of debris that may lead to shorting of the switch or relay.

To reduce mechanical damage imparted to switch and relay contacts, switches and relays may be fabricated using conductive liquid materials to wet the movable mechanical structures to prevent solid to solid contact. A switch that employs a conductive liquid is disclosed in U.S. Pat. No. 6,323,447, entitled "Electrical Contact Breaker Switch, Integrated Electrical Contact Breaker Switch, And Electrical Contact Switching Method." The switch described in U.S. Pat. No. 6,323,447 uses one or more heaters to heat a non-conducting fluid. The heated non-conducting fluid expands to exert pressure on the conductive liquid. The pressure exerted on the conductive liquid divides the droplet of conductive liquid, thus causing the switching function. Another conductive liquid switch that employs gas pressure to actuate the switch is disclosed in co-pending, commonly assigned, U.S. patent application Ser. No. 11/068,633, entitled "Liquid Metal Switch Employing A Single Volume Of Liquid Metal". The switch described in U.S. patent application Ser. No. 11/068,633 uses one or more heaters to heat a non-conducting fluid. The heated non-conducting fluid expands to exert pressure on a single volume of conductive liquid. The pressure exerted on the conductive liquid causes the conductive liquid to translate in a cavity, thus causing the switching function.

Unfortunately, due to one or more of contamination, oxidation and amalgamation of the conductive liquid metal, and especially after a period of inactivity, the droplet of conductive liquid tends to adhere to the surfaces of the channel in which it is located and is difficult to move when switching is desired. Prior techniques to minimize the adhesion effect and cause actuation of the conductive liquid droplet include designing the channel in such a way to reduce friction forces between the droplet and the channel, and employing metallic materials for the electrodes that minimize adhesion between the electrodes and the conductive liquid.

However, these techniques have only been marginally successful in minimizing the negative effects on the conductive liquid droplet mentioned above.

SUMMARY OF THE INVENTION

In accordance with an embodiment of the invention, a circuit for actuating a switch comprises a conductive liquid switch comprising a conductive liquid droplet and a control processor configured to receive a switching signal and configured to provide at least one actuation pulse to the conductive liquid droplet to initiate movement of the conductive liquid droplet based on a duration of a time period between the switching signal and a preceding switching signal.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A circuit having a microcontroller receives a switching signal and provides one or more actuation pulses to a switch having a conductive liquid droplet as the actuating mechanism. Such a switch is referred to as a liquid metal switch and is switched by heating a non-conducting fluid. The heated non-conducting fluid expands to exert pressure on the conductive liquid droplet, thus causing the conductive liquid droplet to move and actuate a switch. When the droplet is located in a confined channel having electrical contacts, the droplet can be used to switch electrical signals. A switch that employs a conductive liquid is disclosed in the above-described U.S. Pat. No. 6,323,447, entitled "Electrical Contact Breaker Switch, Integrated Electrical Contact Breaker Switch, And Electrical Contact Switching Method," the disclosure of which is incorporated by reference herein. Another conductive liquid switch that employs gas pressure to actuate the switch is disclosed in the above-mentioned co-pending, commonly assigned, U.S. patent application Ser. No. 11/068,633, entitled "Liquid Metal Switch Employing A Single Volume Of Liquid Metal," the disclosure of which is also incorporated herein by reference.

While described below as being used in a liquid metal switch that uses liquid pressure to actuate the switch, the circuit for initiating conductive liquid droplet motion in a switch can be used in any liquid metal switching application in which an electrical pulse is used to initiate the motion of the conductive liquid. In some applications, the motion of the conductive liquid is caused by an effect that is sometimes referred to as "electrowetting" or "electrowetting on dielectric (EWOD)".

Figure 1:
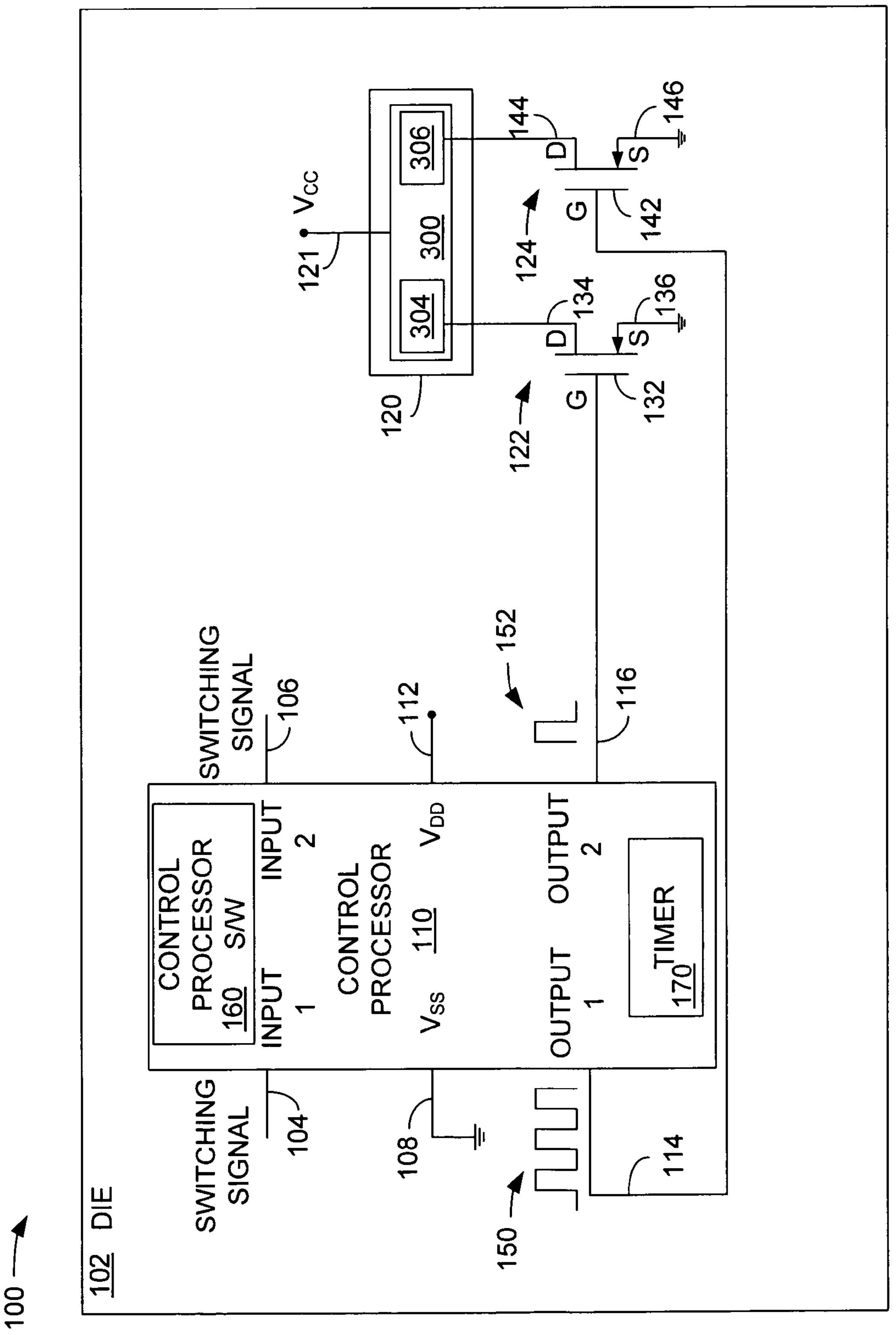
FIG. 1 is a schematic diagram illustrating a control system for a switch containing a conductive liquid droplet.

FIG. 1 is a schematic diagram illustrating a control system 100 for a switch containing a conductive liquid droplet. The control system includes a control processor 110 and a switch 120. The switch 120 comprises one or more switch elements 300. For example, the switch element 300 can be fabricated in accordance with that disclosed in the above-mentioned U.S. Pat. No. 6,323,447, or in the above-mentioned co-pending, commonly assigned, U.S. patent application Ser. No. 11/068,633.

In accordance with an embodiment of the invention, the control processor 110 receives an input switching signal and provides as an output one or more electrical pulses that are used to actuate the switch element 300. The input switching signal can be an electrical signal that is used as the input to communicate that switching is desired. The control processor

110 converts the input switching signal to one or more electrical pulses that are delivered to the one or more heaters 304 and 306 that are part of the switch element 300. The switch element 300 receives power via connection 121. An embodiment of the switch element 300 will be described in detail below. If, for example, the conductive liquid in the switch element 300 has been immobile for a period of time, more than one electrical pulse can be used to impart motion to the conductive droplet. However, there may be operating conditions in which a single pulse can cause the conductive droplet to move. For example, in an embodiment, if the conductive droplet has been actuated within a period of approximately 30 minutes, one electrical pulse will likely be sufficient to impart motion to the conductive droplet. However, the time period of approximately 30 minutes is dependent upon a number of factors including, for example, the degree of the contamination, oxidation and amalgamation of the liquid metal droplet, the volume of the liquid metal in the droplet and the structure of the channels in which the conductive droplet resides.

The control processor 110 comprises input connections 104 and 106 that are adapted to receive switching signals. The switching signals are provided by logic that is omitted from FIG. 1 for simplicity. The control processor 110 is configured to provide an output signal on connection 114 in response to an input signal on connection 104. The control processor 110 is configured to provide an output signal on connection 116 in response to an input signal on connection 106. The output signals on connections 114 and 116 are designed to be supplied to the switch element 300 so that a conductive liquid droplet can be caused to make and break an electrical connection. The control processor 110 is coupled to a power source via connection 112 and is coupled to ground via connection 108.

In an embodiment, the control processor 110 consumes a small amount of power and can be placed in a standby mode of operation. As will be described below, the control processor 110 can be implemented in hardware, software or a combination of hardware and software. An exemplary software module is illustrated as control processor software 160. The control processor software 160 can be used to control the operation of the control processor 110. Alternatively, firmware may be used instead of the software 160. The control processor 110 also includes a timer 170. The timer 170 determines the amount of time between input switching signals so that an appropriate output signal can be generated by the control processor 110. The operation of the timer 170 will be described below.

The hardware implementation of the control processor 110 can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The control processor software 160 comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The control processor generally remains in a standby mode until a switching signal is received on connection 104 or on connection 106. Upon receiving a switching signal on connection 104 or connection 106, the control processor is activated. After a predetermined time during which no switching signal is received on connection 104 or connection 106, the control processor 110 returns to standby mode.

Regardless of the mode of operation, the control processor 110 monitors the input connection 104 and the input connection 106 for a switching signal. When a switching signal is received on either connection 104 or connection 106, the control processor begins to process the input signal. If the duration between two consecutive switching signals received on connections 104 or 106 is greater than a predetermined threshold, the control processor provides a series of output pulses on the appropriate output connection 114 or 116. In an example, an input signal, also referred to as a switching signal, received on connection 104 causes an output signal on connection 114. Similarly, an input signal on connection 106 causes an output signal on connection 116. However, this designation is arbitrary. If the above-mentioned time period between two consecutive switching signals exceeds the predetermined threshold, then the control processor 110 provides a predetermined number of output pulses on the appropriate output connection to initiate motion in the conductive droplet. In this example, the output pulses 150 are shown as being provided over output connection 114. However, the output pulses can also be supplied via connection 116.

The duration of time between the two consecutive input switching signals is determined by the application of the liquid metal switch or by user specifications. In an embodiment, the duration between input switching signals can be 50 milliseconds (ms). However, in another embodiment, the duration between switching signals can be on the order of a few days, or even months.

The predetermined threshold is determined by the degree of the contamination, oxidation and amalgamation of the liquid metal comprising the conductive droplet, the volume of liquid metal in the droplet and the structure of the channels in which the conductive droplet resides. In an embodiment, the threshold between input switching signals is 30 minutes, but the threshold value depends on a number of factors including, but not limited to, the material of the conductive droplet, the material of the channels in which the conductive droplet resides, the switching application, and other factors. For example, in alternative embodiments, the threshold can be 10 minutes, 1 hour, 10 hours or even a few days. The threshold should be sufficiently short to ensure that most or all of the liquid metal material can be actuated by a single actuating pulse when the duration between input switching signals is shorter than the predetermined period.

In an embodiment, the number of output pulses supplied by the control processor 110 when the duration between input switching signals equals or exceeds the threshold can be, for example, 50 pulses. However, the number of output pulses is chosen based on the parameters of the switch. The number of output pulses 150 should be sufficient to break or connect nearly all the switches, when a plurality of switch elements are provided in a switch 120.

For a single pulse 152, the profile of the output pulse can be, for example, 1.5 milliseconds (ms) on. For multiple pulses 150, the profile of the output pulse train can be a repeating cycle of, for example, 1.5 ms on 50 ms off until the defined number of output pulses are delivered. The width of the pulses depends on the electric power, which is applied to the heaters, and is illustrated here as between approximately 1-2 ms. The power applied to the heaters 304 and 306 is determined by the design of the switch 120. In one example, the pulse width can be 1 ms to 1.667 ms when the power supplied to the heaters 304 and 306 is 13 watts (W). A pulse width of approximately 1 ms to 1.667 ms and an idle time between pulses of 50 ms results in a duty cycle of about 2%~3%. The idle time of 50 ms is chosen to allow the temperature of the gases in the switch cavity to return to ambient temperature between pulses.

The plurality of output pulses 150 is provided if the switch element 300 has remained inactive for at least the predetermined period of time. The plurality of output pulses 150 causes the conductive liquid within the switch element 300 to overcome the above-mentioned adhesion forces between the conductive liquid and the channel in which the conductive liquid is located and initiates the movement of the conductive liquid droplet. In this example, the plurality of output pulses 150 is directed via connection 114 to the gate terminal 142 of a transistor 124. The drain terminal 144 of the transistor 124 directs the actuating signal to the switch element 300, and in particular, to the heater 306.

If the above-mentioned time gap between two consecutive switching signals is less than the predetermined duration, then the control processor 110 provides a single output pulse on the appropriate output connection. In this example, a single output pulse 152 is shown as being provided over output connection 116 to the gate terminal 132 of the transistor 122. The drain terminal 134 of the transistor 122 directs the actuating signal to the switch element 300, and in particular, to the heater 304. The transistors 122 and 124 can be implemented using any suitable technology. The single output pulse 152 is provided if the switch element 300 has been switched within the predetermined period of time. If the switch element 300 has been switched within the predetermined period of time, the above-mentioned adhesion forces between the conductive liquid and the channel can typically be overcome by a single pulse.

Because the conductive liquid was recently switched, the single output pulse 152 is sufficient to cause the conductive liquid within the switch element 300 to actuate. As will be described below, the output pulse, or pulses, from the control processor 110, is supplied to the one or more heating elements within the switch element 300 that are used to heat the non-conductive fluid and cause the conductive liquid to actuate. Although shown using the example of a plurality of pulses 150 being delivered via connection 114 to the transistor 124 and a single pulse 152 being delivered via connection 116 to the transistor 122, this designation is arbitrary. Connections 114 and 116 can each supply a single pulse or a plurality of pulses to the switch element 300.

In an embodiment, the control processor is a small outline six-pin package measuring 1×3 millimeters (mm) square. In an alternative implementation, the control processor 110 can be integrated into a single package along with the switch element 300 and fabricated on a single die 102. Further, the exemplary control processor 110 consumes less than 0.1 microamps (μA) in standby mode.

Figure 2A:
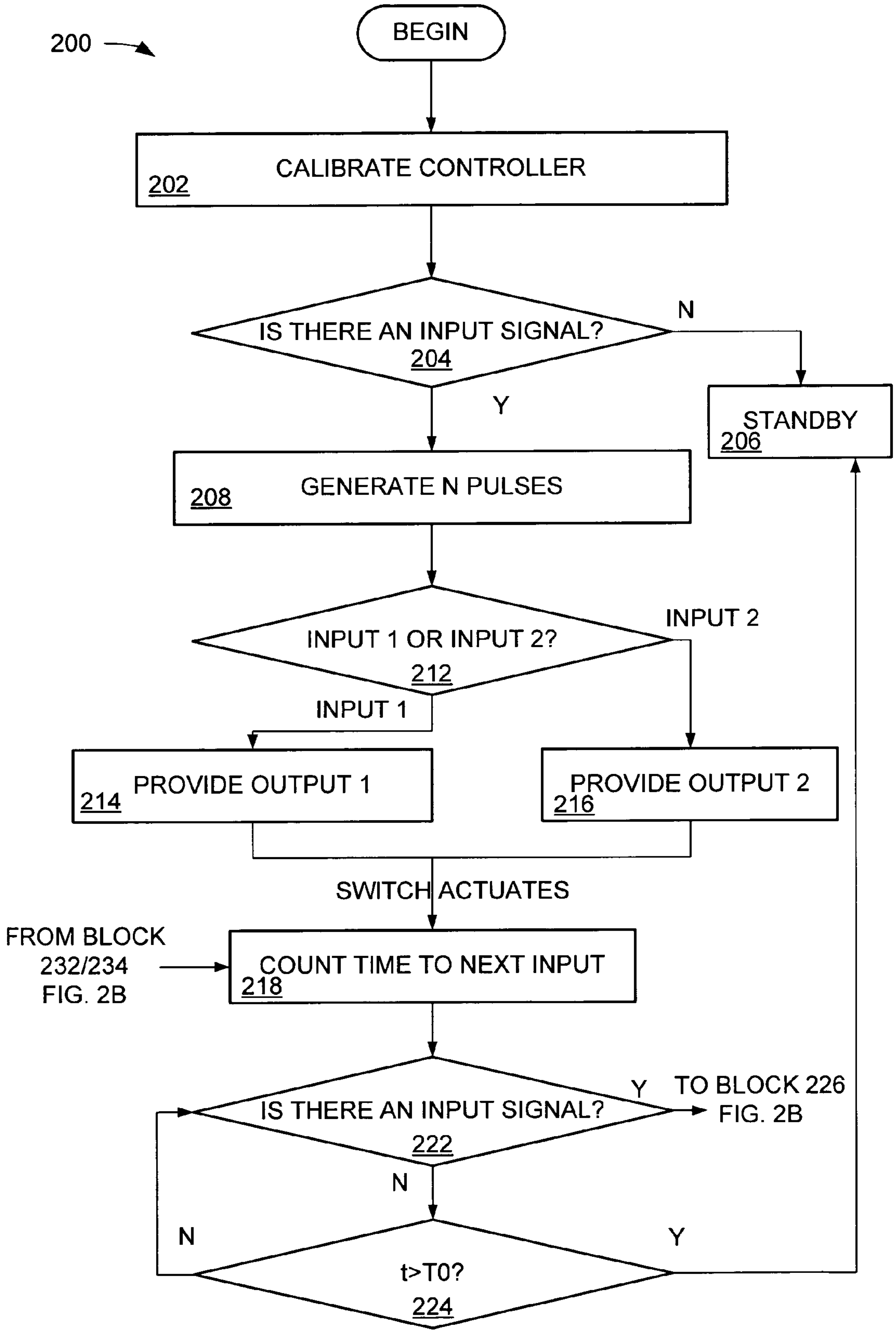
FIGS. 2A and 2B are a flow chart collectively illustrating an embodiment of the operation of the control system of FIG. 1.
Figure 2B:
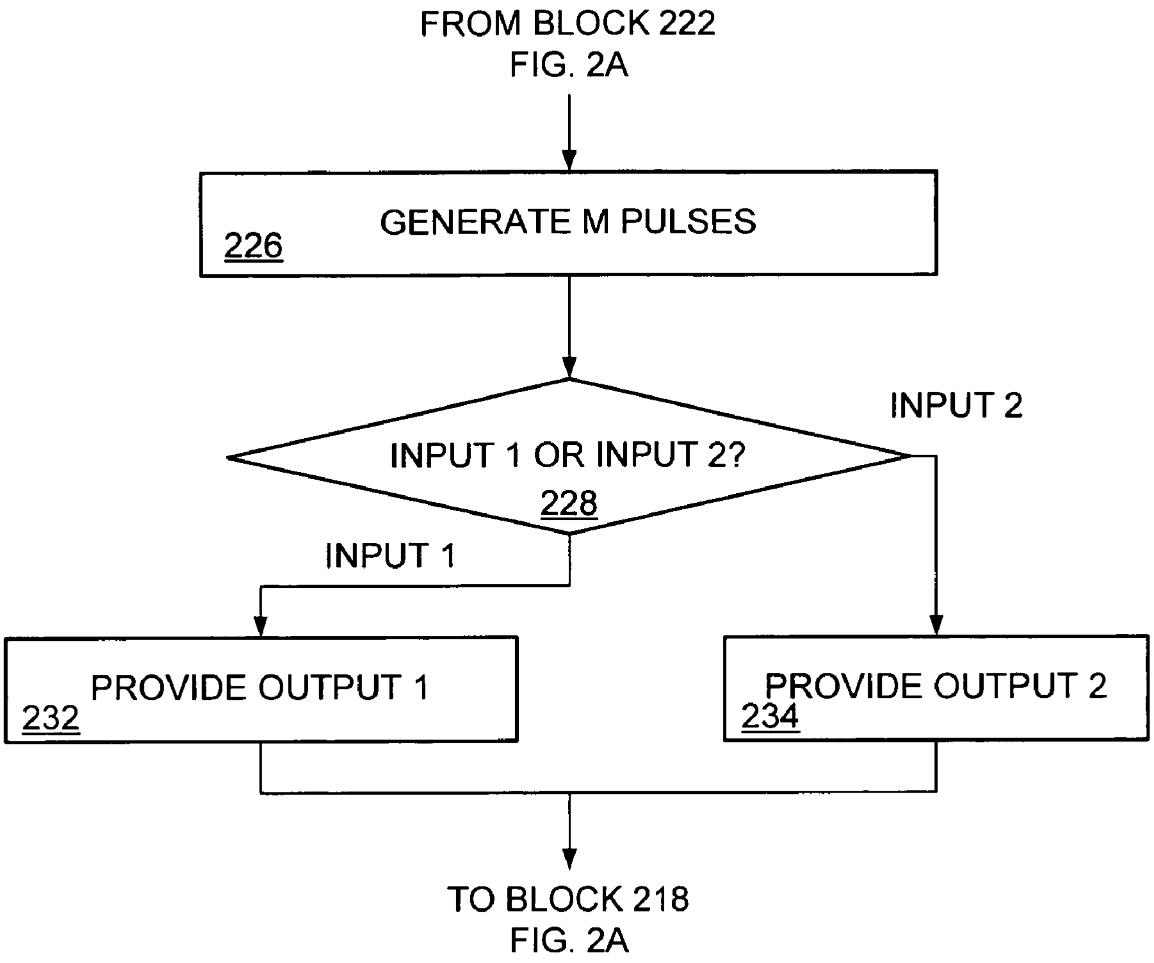

FIGS. 2A and 2B are a flow chart collectively illustrating an embodiment of the operation of the control system of FIG. 1. In block 202, the control processor 110 (FIG. 1) is calibrated and reset. In block 204 it is determined whether there is an input switching signal directed to the control processor 110 regardless of whether the control processor 110 is in standby mode or powered on. If there is no input switching signal supplied to the control processor 100, then, in block 206, the control processor 110 enters a standby mode. If in block 204 it is determined that there is an input switching signal supplied to the control processor 110, then, in block 208, a number "n" of control pulses are generated by the control processor 110. The number "n" can be equal to one or more. For example, assuming that the switch element 300 (FIG. 1) was inactive for a period of time sufficient to cause the conductive liquid droplet to adhere to the surfaces with which it is in contact, then the number "n" of pulses will be greater than one (1) because it is determined that more than one pulse is needed to initiate movement of the conductive liquid droplet. In this example, a plurality of pulses 150 (FIG. 1) is delivered to the switch element 300 to initiate movement of the conductive droplet.

In block 212 it is determined whether the input switching signal was supplied to the input connection 104 or to the input connection 106. If it is determined in block 212 that the input switching signal is supplied to the input 104, then, in block 214, the output signal is supplied on connection 114 to the transistor 124. If it is determined in block 212 that the input switching signal is supplied to the input 106, then, in block 216, the output signal is supplied on connection 116 to the transistor 122. However, this designation is arbitrary.

In block 218, the time between input switching signals is counted. For example, the timer 170 (FIG. 1) can determine the amount of time between input switching signals. In block 222 it is determined whether another input switching signal is received by the control processor 110 before a predetermined time period has elapsed. In this example, the threshold is 30 minutes, but can be other values. If an additional input switching signal is received prior to the expiration of the threshold time period, then, in block 226, a number "m" of activation pulses is generated by the control processor and delivered to the switch element 300 as described above. If the additional input switching signal occurs within the above-mentioned time period, then the number "m" is equal to one (1) and a single pulse (152, FIG. 1) is sufficient to impart motion to the conductive liquid droplet and a single pulse is delivered to the switch element 300. If, in block 222, it is determined that an input switching signal is not received, then, in block 224, it is determined whether the threshold time period described above has elapsed. If the threshold time period has elapsed, then, in block 206, the control processor 110 enters the standby mode. If the time period has not elapsed the process returns to block 222 when an additional input switching signal is awaited.

In block 228 it is determined whether the input switching signal was supplied to the input connection 104 or to the input connection 106. If it is determined in block 228 that the input switching signal is supplied to the input 104, then, in block 232, the output signal is supplied on connection 114 to the transistor 124. If it is determined in block 228 that the input switching signal is supplied to the input 106, then, in block 234, the output signal is supplied on connection 116 to the transistor 122. However, this designation is arbitrary. The process then returns to block 218, where the time between input switching signals is counted and another input switching signal is awaited.

Figure 3A:
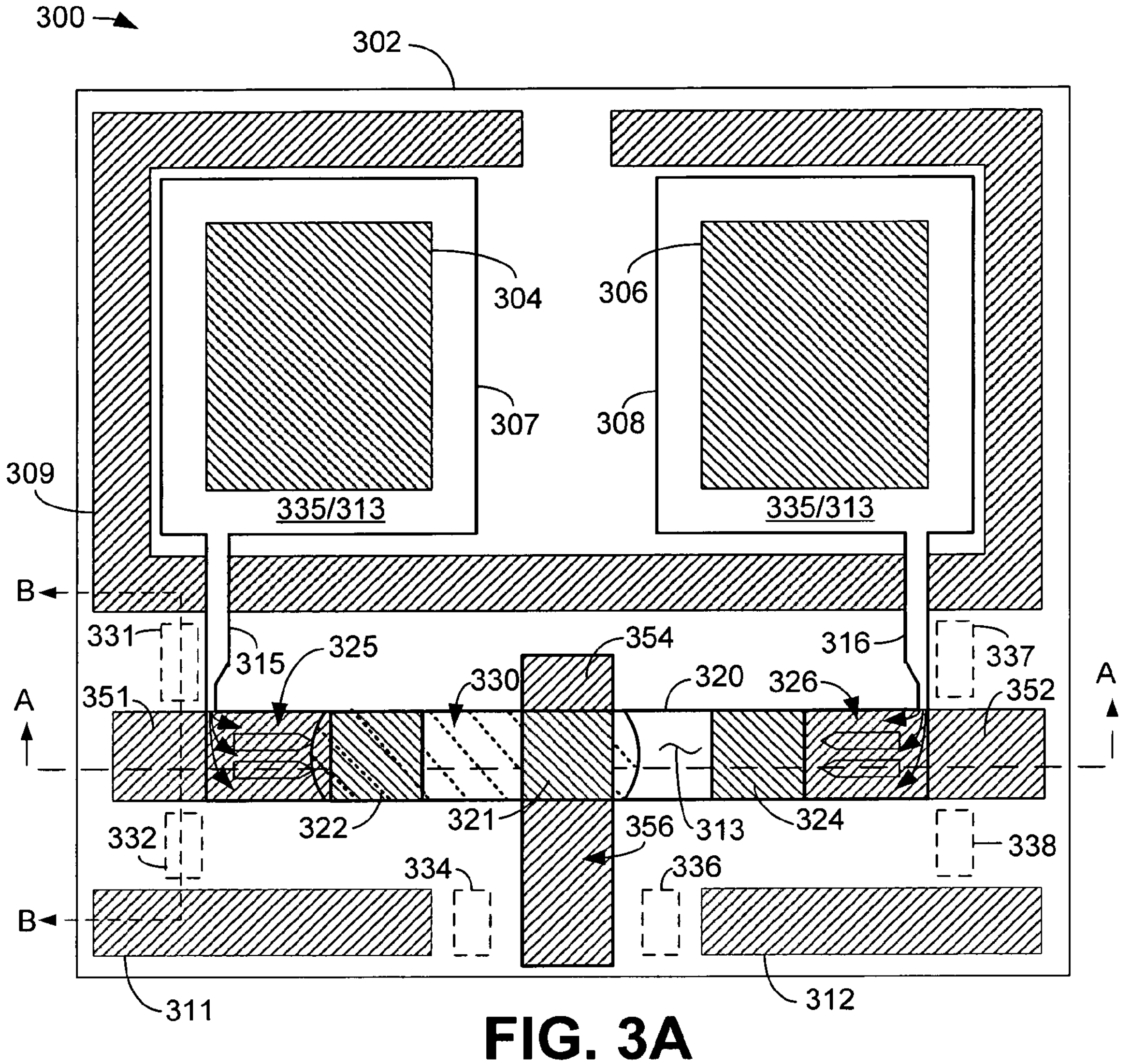
FIGS. 3A and 3B are schematic diagrams illustrating a liquid metal switch with which the control system of FIG. 1 can be implemented.
Figure 3B:
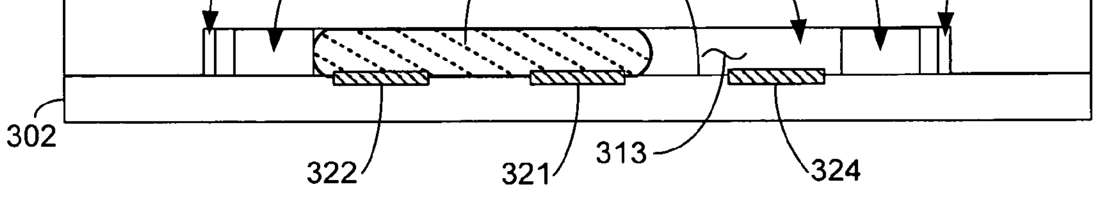

FIGS. 3A and 3B are schematic diagrams illustrating a conductive liquid switch that uses a liquid metal as the switching element on which the control system 100 of FIG. 1 can be implemented. The liquid metal switch is implemented in a liquid metal micro-switch that uses gas pressure to cause translation of the liquid metal droplet. FIG. 3A is a schematic diagram illustrating a micro circuit 300. In this example, the micro-circuit 300 can be a liquid metal micro-switch. The liquid metal micro-switch 300 is fabricated on a substrate 302 that may include one or more layers (not shown). For example, the substrate 302 can be partially covered with a dielectric material (not shown) and other material layers. The liquid metal micro-switch 300 can be a fabricated structure using, for example, thin film deposition techniques and/or thick film screening techniques that could comprise either single layer or multi-layer circuit substrates.

The liquid metal micro-switch 300 includes heaters 304 and 306. The heater 304 resides within a heater cavity 307 and the heater 306 resides within a heater cavity 308. The liquid metal micro-switch 300 also includes a cover, or cap, which is omitted from FIG. 3A The cavities 307 and 308 can be filled with a non-conductive gas, which can be, for example, nitrogen ($N_2$) and which is illustrated using reference numeral 335. The heater cavity 307 is coupled via a sub-channel 315 to a main channel 320. The main channel 320 is also referred to as a fluid cavity. Similarly, the heater cavity 308 is coupled via sub-channel 316 to the main channel 320. The main channel 320 is partially filled with a single droplet 330 of liquid metal. However, in some applications, there may be two separate droplets of conductive liquid that are divided by gas pressure to actuate the switching function. The droplet 330 is sometimes referred to as a "slug." The liquid metal, which can be, for example, a gallium-based alloy containing gallium and indium, tin, zinc and copper, or a combination thereof, is in constant contact with an input contact 321 and one of two output contacts 322 and 324. The droplet 330 is surrounded in the main channel 320 by the secondary fluid 313.

A portion 351 of metallic material underlying the contact 322 extends past the periphery of the main channel 320 onto the substrate 302. Similarly, a portion 352 of metallic material underlying the output contact 324 extends past the periphery of the main channel 320 onto the substrate 302, and portions 354 and 356 of the metallic material underlying the input contact 321 extend past the periphery of the main channel 320 onto the substrate 302. The metal portions 351, 352, 354 and 356 are generally covered by a dielectric, which is omitted from FIG. 3A for simplicity of illustration. Metallic material is also deposited, or otherwise applied to the substrate 302 approximately in regions 309, 311 and 312 to provide metal bonding capability to attach a cap, if desired. The cap, also referred to as a cover that defines walls and a roof, will be described below. Bonding the roof to the switch 300 may also be accomplished by anodic bonding, in which case the regions 309, 311 and 312 would include a layer of amorphous silicon. The output contacts 322 and 324 are typically fabricated as small as possible to minimize the amount of energy used to separate the droplet 330 from the output contact 322 or from the output contact 324 when switching is desired. Further, minimizing the area of the contacts 321, 322 and 324 further improves electrical isolation among the contacts by minimizing the likelihood of capacitive coupling between the droplet 330 and the contact with which the droplet is not in physical contact.

The main channel 320 includes a feature 325 and a feature 326 as shown. The features 325 and 326 can be fabricated on the surface of the substrate 302 as, for example, islands that extend upward from the base of the main channel 320 and that contact the edge of the liquid metal droplet 330 as shown. These features 325 and 326 may also be defined as part of the cover that defines the sidewalls and roof of the channel 320. The features 325 and 326 determine the at-rest position of the liquid metal droplet 330. To effect movement of the liquid metal droplet 330 and therefore perform a switching function, one of the heaters 304 or 306 heats the gas 335 in the heater cavity 307 or 308 causing the gas 335 to expand and travel through one of the sub-channels 315 or 316. The expanding gas 335 exerts pressure on the droplet 330, causing the droplet 330 to translate through the main channel 320. In accordance with an embodiment of the invention, based on the length of time since actuation, the control processor 110 (FIG. 1) determines whether a single pulse supplied to the heater 304 or 306 is sufficient to cause the droplet 330 to translate, or whether multiple pulses are needed to cause the droplet 330 to translate. In some instances the droplet 330 may adhere to the surfaces of the main channel 320. In such instances, and to overcome the adhesion between the droplet 330 and the surfaces of the main channel 320, the control processor 110 is configured to provide a plurality of pulses that supplied to the heater 304 or 306. The plurality of pulses cause the heater 304 or 306 to rapidly cycle, thus overcoming the adhesion between the droplet 330 and the surfaces of the main channel 320, thus imparting motion on the droplet 330.

When the position of the droplet 330 is as shown in FIG. 3A, the heater 304 heats the gas 335 in the heater cavity 307, thus expanding and forcing the gas through the sub-channel 315 and around the feature 325 so that a relatively constant wall of pressure is exerted against the droplet 330. The gas pressure thus exerted causes the droplet to move towards the output contact 324. The feature 325 and the feature 326 prevent the droplet 330 from extending past a definable point in the main channel 320, but allow the droplet 330 to easily de-wet from the features 325 and 326 when movement of the droplet 330 is desired. When the cavity 307 and the cavity 308 are filled with the secondary fluid 313, to perform the switching function one of the heaters 304 or 306 boils the secondary fluid 313. The motion of the expanding boiled secondary fluid 313 in the vicinity of the heater 304 or 306 causes a bubble to form. The pressure of the expanding bubble on the surrounding unboiled secondary fluid 313 then imparts work on the droplet 330, causing the droplet 330 to translate through the main channel 320 and cause switching to occur.

Further, because a single droplet 330 is used in the micro-switch 300, the likelihood that the droplet 330 will fragment into microdroplets that may enter the sub-channels 315 and 316 is significantly reduced when compared to a switch in which the liquid metal droplet is divided into multiple segments to provide the switching action.

Although omitted for clarity in FIG. 3A, the main channel 320 also includes one or more vents that are used to load the liquid metal into the main channel 320. The vents can be sealed after the introduction of the liquid metal and the secondary fluid.

The main channel 320 also includes one or more defined areas that include surfaces that can alter and define the contact angle between the droplet 330 and the main channel 320. A contact angle, also referred to as a wetting angle, is formed where the droplet 330 meets the surface of the main channel 320. The contact angle is measured at the point at which the surface, liquid and secondary fluid meet. A high contact angle is formed when the droplet 330 contacts a surface that is referred to as relatively non-wetting, or less wettable. The wettability is generally a function of the material of the surface and the material from which the droplet 330 is formed, and is specifically related to the surface tension of the liquid. Further, it is desirable that the secondary fluid 313 be relatively wetting with respect to the droplet 330 and with respect to the surfaces in the main channel 320.

Portions of the main channel 320 can be defined to be wetting, non-wetting, or to have an intermediate contact angle. For example, it may be desirable to make the portions of the main channel 320 that extends past the output contacts 322 and 324 to be less, or non-wetting to prevent the droplet 330 from entering these areas. Similarly, the portion of the main channel in the vicinity of the features 325 and 326 may be defined to create an intermediate contact angle between the droplet 330 and the main channel 320. The areas of the main channel 320 that contain the secondary fluid 313 are typically wetting to facilitate loading the secondary fluid into the main channel 320.

The liquid metal micro-switch 300 also includes one or more gaskets, as shown using reference numerals 331, 332, 334, 336, 337 and 338.

FIG. 3B is a simplified cross-sectional view through section A-A of FIG. 3A. The substrate 302 supports the liquid metal droplet 330 approximately as shown. The droplet 330 is in contact with the input contact 321 and the output contact 322, and rests against the feature 325. When gas pressure is exerted through the sub-channel 315, the gas 335 passes around and through portions of the feature 325, exerting pressure on the droplet 330 and causing the droplet 330 to move toward the output contact 324. Portions of the surface 342 of the substrate 302 include a material or surface treatment designed to produce an intermediate contact angle between the droplet 330 and the surface 342. An area of intermediate wettability forms an intermediate contact angle under the droplet and in the vicinity of, but not in contact with the input contact 321 and the output contacts 322 and 324. In general, the contact angle between a conductive liquid and a surface with which it is in contact ranges between 0° and 180° and is dependent upon the material from which the droplet is formed, the material of the surface with which the droplet is in contact, and is specifically related to the surface tension of the liquid. A high contact angle is formed when the droplet contacts a surface that is referred to as relatively non-wetting, or less wettable. A more wettable surface corresponds to a lower contact angle than a less wettable surface. An intermediate contact angle is one that can be defined by selection of the material covering the surface on which the droplet is in contact and is generally an angle between the high contact angle and the low contact angle corresponding to the non-wetting and wetting surfaces, respectively. If the gas pressure exerted against the droplet causes the droplet 330 to overshoot the desired position, the intermediate contact angle helps cause the droplet 330 to return to the desired position in the vicinity of, and in contact with, the output contact 322 or 324. The liquid metal micro-switch 300 also includes a cap 340, thus encapsulating the droplet 330. The cap 340 defines a fluid cavity in the main channel 320.

This disclosure describes embodiments in accordance with the invention in detail. However, it is to be understood that the invention defined by the appended claims is not limited to the precise embodiments described.

What is claimed is:

1. A circuit for actuating a switch, comprising:

a conductive liquid switch comprising a conductive liquid droplet; and a control processor configured to receive a switching signal and configured to provide at least one actuation pulse to the conductive liquid droplet to initiate movement of the conductive liquid droplet based on a duration of a time period between the switching signal and a preceding switching signal.

2. The circuit of claim 1, further comprising a timer for determining the time period between at least two switching signals.

3. The circuit of claim 2, further comprising a predetermined threshold value against which the time period is measured.

4. The circuit of claim 3, further comprising at least one transistor for providing a plurality of actuation pulses to the switch when the time period between switching signals at least equals the predetermined threshold.

5. The circuit of claim 3, further comprising at least one transistor for providing a single actuation pulse to the switch when the time period between switching signals is less than the predetermined threshold.

6. The circuit of claim 3, in which the predetermined threshold is thirty minutes.

7. The circuit of claim 3, in which the predetermined threshold is determined based on the material of the conductive liquid droplet.

8. A method for actuating a switch, comprising:

providing a conductive liquid switch comprising a conductive liquid droplet;

receiving a switching signal in a control processor associated with the switch; and providing an actuation signal comprising at least one actuation pulse to initiate movement of the conductive liquid droplet based on a duration of a time period between the switching signal and a preceding switching signal.

9. The method of claim 8, further comprising determining the time period between a plurality of switching signals.

10. The method of claim 9, further comprising measuring the time period against a predetermined threshold.

11. The method of claim 10, further comprising determining if the time period between switching signals exceeds the predetermined threshold.

12. The method of claim 11, further comprising providing a plurality of actuation pulses to the switch when the time period between switching signals at least equals the predetermined threshold.

13. The method of claim 11, further comprising providing a single actuation pulse to the switch when the time period between switching signals is less than the predetermined threshold.

14. The method of claim 11, in which the predetermined threshold is thirty minutes.

15. A method for actuating a switch, comprising:

providing a conductive liquid switch comprising a conductive liquid droplet;

receiving a switching signal in a control processor associated with the switch; and providing an actuation signal comprising a plurality of actuation pulses to initiate movement of the conductive liquid droplet based on a duration of a time period between the switching signal and a preceding switching signal.

16. The method of claim 15, further comprising determining the time period between a plurality of switching signals.

17. The method of claim 16, further comprising measuring the time period against a predetermined threshold.

18. The method of claim 16, further comprising determining if the time period between switching signals exceeds the predetermined threshold.

19. The method of claim 18, further comprising providing a plurality of actuation pulses to the switch when the time period between switching signals at least equals the predetermined threshold.

* * * * *